(12) United States Patent
Allison et al.

(10) Patent No.: US 7,537,818 B2
(45) Date of Patent: *May 26, 2009

(54) SOUND ABSORPTIVE MULTILAYER ARTICLES AND METHODS OF PRODUCING SAME

(75) Inventors: Timothy J. Allison, Old Fort, NC (US); Surendra Khambete, West Bloomfield, MI (US); Fred Skidmore, Marion, NC (US); Bill Griffin, Indian Trail, NC (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 300 days.

This patent is subject to a terminal disclaimer.

(21) Appl. No.: 10/508,101

(22) PCT Filed: Jun. 7, 2004

(86) PCT No.: PCT/US2004/017860

§ 371 (c)(1),
(2), (4) Date: Sep. 15, 2004

(87) PCT Pub. No.: WO2004/017860

PCT Pub. Date: Sep. 15, 2005

(65) Prior Publication Data

US 2006/0090832 A1 May 4, 2006

(51) Int. Cl.
*B32B 3/10* (2006.01)
*B32B 33/00* (2006.01)
*B32B 5/06* (2006.01)
*B32B 5/26* (2006.01)
*D05C 17/02* (2006.01)
*A47G 27/02* (2006.01)

(52) U.S. Cl. .......................... 428/95; 428/96; 428/131; 428/137; 428/138; 442/381; 442/387; 442/388

(58) Field of Classification Search .................. 428/85, 428/95–96; 156/72, 238
See application file for complete search history.

(56) References Cited

U.S. PATENT DOCUMENTS 3,728,182 A     4/1973  Wisotzky et al. .............. 156/72

(Continued)

FOREIGN PATENT DOCUMENTS

WO        WO 02/14062        2/2002

(Continued)

OTHER PUBLICATIONS

"layer." Merriam-Webster Online Dictionary. 2008. Merriam-Webster Online. Jun. 5, 2008 <http://www.merriam-webster.com/dictionary/layer>.*

(Continued)

*Primary Examiner*—Jennifer A Chriss
(74) *Attorney, Agent, or Firm*—Myers Bigel Sibley & Sajovec, P.A.

(57) ABSTRACT

Acoustically absorptive carpeting includes a primary layer of fibrous material with yarn tufts extending outwardly therefrom and a secondary layer of thermoplastic material that forms a carpet backing. The carpet backing is rendered porous. A substrate of porous material is attached to the carpet backing. The substrate includes a layer of fine fibrous material attached to a layer of coarse fibrous material. The layers of fine and coarse fibrous material each have respective different acoustic impedances. The layer of coarse fibrous material has fibers in an open, loose configuration. The carpet backing is bonded to the layer of coarse fibrous material with a thermoplastic adhesive material such that the thermoplastic adhesive material encapsulates individual fibers of the layer of coarse fibrous material without extending therebetween.

8 Claims, 5 Drawing Sheets

U.S. PATENT DOCUMENTS

| | | | | |
|---|---|---|---|---|
| 3,773,605 | A | 11/1973 | Pihlstrom | 161/43 |
| RE29,524 | E | 1/1978 | Spencer | 428/134 |
| 4,078,100 | A | 3/1978 | Doerfling | 427/314 |
| 4,112,161 | A * | 9/1978 | Sorrells | 428/95 |
| 4,131,704 | A | 12/1978 | Erickson et al. | |
| 4,199,635 | A | 4/1980 | Parker | |
| 4,283,457 | A | 8/1981 | Kolsky et al. | 428/285 |
| 4,477,299 | A | 10/1984 | Friedrich | 156/72 |
| 4,693,928 | A | 9/1987 | Foss | 428/236 |
| 4,818,586 | A * | 4/1989 | Smith et al. | 428/198 |
| 4,828,910 | A | 5/1989 | Haussling | 428/284 |
| 5,677,027 | A | 10/1997 | Masuda et al. | |
| 5,679,441 | A | 10/1997 | Saelens et al. | 428/198 |
| RE36,323 | E | 10/1999 | Thompson et al. | 181/286 |
| 6,109,389 | A | 8/2000 | Hiers et al. | |
| 6,143,118 | A | 11/2000 | Hornaman et al. | 156/238 |
| 6,204,209 | B1 | 3/2001 | Rozek et al. | 442/374 |
| 7,182,994 | B1 * | 2/2007 | Scott | 428/131 |
| 7,279,214 | B2 * | 10/2007 | Nicolai et al. | 428/137 |
| 2002/0187300 | A1 * | 12/2002 | Nakasuji et al. | 428/95 |
| 2004/0077247 | A1 | 4/2004 | Schmidt et al. | |
| 2004/0213964 | A1 | 10/2004 | Tilton et al. | |

FOREIGN PATENT DOCUMENTS

| | | |
|---|---|---|
| WO | WO 02/068180 | 9/2002 |
| WO | WO 02/091977 | 11/2002 |

OTHER PUBLICATIONS

"zone." Merriam-Webster Online Dictionary. 2008. Merriam-Webster Online. Jun. 5, 2008 <http://www.merriam-webster.com/dictionary/layer>.*

International Search Report and The Written Opinion of The International Searching Authority, corresponding to International Application No. PCT/US2004/017860, mailed Sep. 7, 2006.

* cited by examiner

SOUND ABSORPTIVE MULTILAYER ARTICLES AND METHODS OF PRODUCING SAME

CROSS-REFERENCE TO RELATED APPLICATIONS

The present application is a 35 U.S.C. § 371 National Phase Application of International Application Serial No. PCT/US04/17860, filed Jun. 7, 2004, which claims priority to U.S. application Ser. No. 10/610,887, filed Jul. 1, 2003, abandoned, the disclosures of each of which are incorporated herein by reference in their entireties.

FIELD OF THE INVENTION

The present invention relates generally to sound absorption and, more particularly, to methods of producing sound absorptive articles.

BACKGROUND OF THE INVENTION

It is generally considered desirable to reduce the level of noise within a vehicle passenger compartment. External noises, such as road noise, engine noise, vibrations, etc., as well as noises emanating from within passenger compartments, may be attenuated through the use of various acoustical materials. Accordingly, sound attenuating materials for vehicles, such as automobiles, are conventionally used in dashboards, in conjunction with carpeting for floor panels, in wheel wells, in trunk compartments, under hoods, as part of headliners, etc.

The attenuation of external noise (i.e., noise emanating from a source external to a vehicle compartment) is conventionally referred to as sound transmission loss (STL). The attenuation of internal noise (i.e., noise emanating from within a vehicle compartment) is conventionally referred to as sound absorption. The acoustic impedance of a material is defined as material density times acoustic velocity, and is expressed in units of Rayls (Newton-seconds/meter$^3$). Acoustic impedance defines how easy it is for air to move through a material. Thus, for fibrous materials, acoustic impedance may depend upon the density of the fibrous material and fiber diameter. Generally, the heavier the blanket and the finer the fibers, the higher the acoustic impedance. Moreover, thicker layers typically have more acoustic impedance than thin layers. The ability of a material to attenuate noise is conventionally defined by the material's collective STL, acoustic impedance, and absorption characteristics.

Carpeting for use within vehicles is conventionally tufted or nonwoven. Tufted carpet generally includes a composite structure in which tufts, or bundles of carpet fibers are introduced (such as by stitching) into a primary backing, such as a woven or non-woven fabric. A secondary backing or coating of thermoplastic material is then applied to the underside of the carpet construction in order to securely retain the tufted material in the primary backing. This secondary backing not only dimensionally stabilizes the construction but can also provide greater abrasion and wear resistance, and may serve as an adhesive for an additional layer of material. Nonwoven carpet is composed of fiber that is mechanically entangled by needling, water jet, or other process.

Vehicle carpeting is conventionally molded into a nonplanar three dimensional contoured configuration which conforms to the contours of a vehicle floor. A secondary coating of thermoplastic material applied to the primary backing may also make the carpeting moldable and shape-sustaining, and may also serve as a barrier to improve the sound attenuating properties of the carpeting.

In general, the ability of conventional materials to attenuate sound increases as the amount of material increases. Unfortunately, increasing the amount of material often increases the weight of sound attenuating material, which may be undesirable. Accordingly, there is a continuing need for acoustical insulation materials for use within vehicles that exhibit superior sound attenuating properties, while also being lightweight and low in cost.

SUMMARY OF THE INVENTION

In view of the above discussion, embodiments of the present invention provide acoustically absorptive articles for use within vehicles, such as automobiles, and methods of producing same. Acoustically absorptive articles, according to embodiments of the present invention, are particularly useful for absorbing sound emanating from within vehicles and emanating from sources external to vehicles. Exemplary automotive applications within which acoustically absorptive articles produced according to embodiments of the present invention may be utilized include, but are not limited to, carpeting and other vehicle floor coverings, trunk liners, spare tire covers, etc.

According to an embodiment of the present invention, a first substrate of porous material is provided. A second substrate of porous material is provided that includes a layer of fine fibrous material attached to a layer of coarse fibrous material. The layer of coarse fibrous material has fibers in an open, loose configuration. The layer of fine fibrous material has fibers oriented close together in random fashion or as produced by any of the typical non-woven manufacturing processes, including needle-punched, airlayed, cross-lapped, etc. The first and second substrates of porous material have respective different acoustic impedances dependent on specific vehicle acoustic needs. The range of impedance utilized could be from "very open" at 50 Rayls to "very closed" at 10,000 Rayls. These substrates can be produced using any accepted process including but not limited to sintering, latex coating, and extrusion coating.

The first substrate of porous material is bonded to the layer of coarse fibrous material with a thermoplastic material having adhesive properties such that the thermoplastic material encapsulates individual fibers of the layer of coarse fibrous material without extending therebetween, and such that the second substrate (as well as the combination of the first and second substrates) remains porous.

A carpet, according to an embodiment of the present invention, includes a primary layer of fibrous material (e.g., a woven or non-woven matrix of thermoplastic fibers) with yarn tufts extending outwardly from a first side thereof. A secondary layer of heated thermoplastic material is applied to the primary layer second side such that the heated thermoplastic material of the secondary layer penetrates the primary layer and forms a carpet backing. The carpet backing is subjected to conditions sufficient to cause the carpet backing to achieve a fluid or semi-fluid (i.e., flowable) state. Once in a fluid or semi-fluid state, air flow of sufficient flow and velocity is forced through the heated carpet backing to create porosity therein.

A substrate of porous material is attached to the carpet backing. The substrate includes a layer of fine fibrous material attached to a layer of coarse fibrous material. The layers of fine and coarse fibrous material each have respective different acoustic impedances. The layer of coarse fibrous material has fibers in an open, loose configuration. The carpet backing is bonded to the layer of coarse fibrous material with a thermoplastic material such that the thermoplastic material encapsulates individual fibers of the layer of coarse fibrous material without extending therebetween, and such that the layer of fine fibrous material remains porous.

According to other embodiments of the present invention, the layer of coarse fibrous material may be bonded directly to the carpet backing via a porous adhesive (or via other known methods). The layer of fine fibrous material may then be bonded directly to the coarse fibrous material via a porous adhesive.

Acoustically absorptive articles having multiple layers with impedance mismatch according to embodiments of the present invention can provide desired sound deadening and absorption properties within vehicles. Moreover, acoustically absorptive articles according to embodiments of the present invention may have reduced overall weight without sacrificing sound absorption properties.

BRIEF DESCRIPTION OF THE DRAWINGS

The accompanying drawings, which form a part of the specification, illustrate embodiments of the present invention. The drawings and description together serve to fully explain the invention.

DETAILED DESCRIPTION OF THE INVENTION

Figure 1:
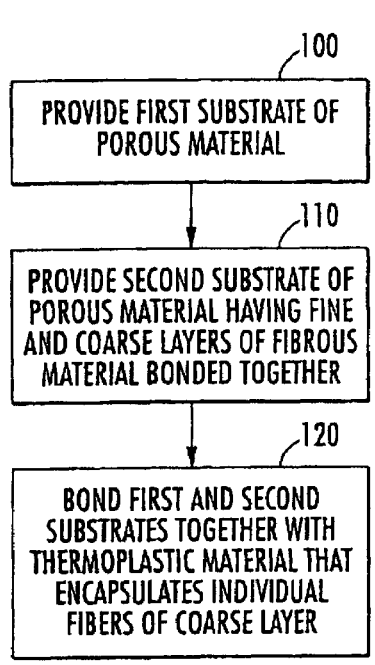
FIG. 1 is a flowchart of operations for producing acoustically absorptive multilayer articles, according to embodiments of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element such as a layer, region, substrate, or panel is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like when used herein are for the purpose of explanation only.

Embodiments of the present invention provide acoustically absorptive articles for use within vehicles, such as automobiles, and methods of producing same. Acoustically absorptive articles, according to embodiments of the present invention, are particularly useful for absorbing sound emanating from within vehicles and emanating from sources external to vehicles. Exemplary automotive applications within which acoustically absorptive articles produced according to embodiments of the present invention may be utilized include, but are not limited to, carpeting and other vehicle floor coverings, trunk liners, spare tire covers, etc.

Referring initially to FIG. 1, operations for producing acoustically absorptive multilayer articles, according to embodiments of the present invention, will be described. A first substrate of porous material is provided (Block 100). A second substrate of porous material is provided that includes a layer of fine fibrous material attached to a layer of coarse fibrous material (Block 110). The layer of coarse fibrous material has fibers in an open, loose configuration. The layer of fine fibrous material has fibers oriented close together. The first and second substrates of porous material have respective different acoustic impedances.

The layer of fine fibrous material includes fibers with a denier of between about 0.1 and about 50, and the layer of coarse fibrous material includes fibers with a denier of between about 1 and about 100. The layers of fine and coarse fibrous material may be attached together in various ways known to those skilled in the art including, but not limited to, needling, thermal point bonding and via adhesives.

According to embodiments of the present invention, the layer of coarse fibrous material may have a thickness in the range of between about 0.5 mm and about 100 mm, and the layer of fine fibrous material may have a thickness in the range of between about 0.5 mm and about 100 mm. The layers of fine and coarse fibrous material may each include natural fibers, synthetic fibers, and blends of natural fiber and synthetic fibers. In addition, recycle content can result in any or all of the deniers stated previously.

The first substrate of porous material is bonded to the layer of coarse fibrous material with a thermoplastic material having adhesive properties such that the thermoplastic material encapsulates individual fibers of the layer of coarse fibrous material without extending therebetween, and such that the second substrate (as well as the combination of the first and second substrates) remains porous (Block 120).

Figure 2:
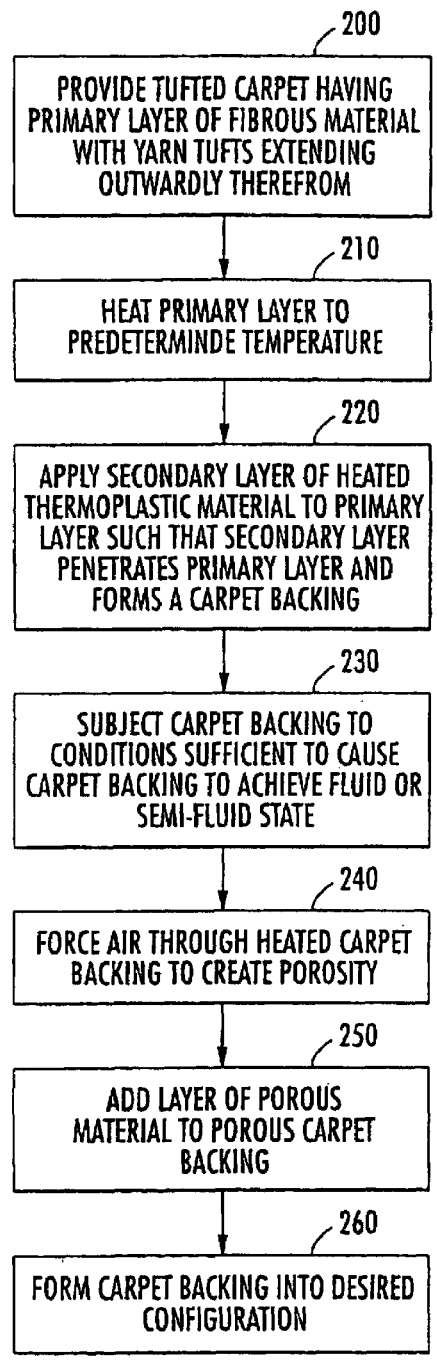
FIG. 2 is a flowchart of operations for producing acoustically absorptive carpeting, according to embodiments of the present invention.

Referring now to FIG. 2, operations for producing porous tufted carpet for use within vehicles, according to embodiments of the present invention, are illustrated. A carpet consisting of a primary layer of fibrous material (e.g., a woven or non-woven matrix of thermoplastic fibers) with yarn tufts extending outwardly from a first side thereof are provided (Block 200). The yarn tufts preferably have a density of between about one-eighth gauge and about one-sixteenth gauge; however, yarn tufts having other gauges may be utilized.

The primary layer may be heated to a predetermined temperature (Block 210). An exemplary range is between about 150° F. and about 280° F., and a particularly preferred range is between about 160° F. and about 220° F. However, it is not required that the primary layer be heated.

A secondary layer of thermoplastic material having a temperature of between about 350° F. and about 500° F. is applied (e.g., via extrusion, etc.) to the primary layer second side such that the secondary layer penetrates the primary layer and forms a carpet backing (Block 220). A particularly preferred temperature range for the secondary layer is between about 400° F. and about 450° F.

The secondary layer is preferably applied in the amount of between about 5 and about 14 ounces per square yard. However, other application ranges may be utilized without limitation. Preferably, the secondary layer penetrates the primary layer by up to about 90% of the thickness of the primary layer. Exemplary thermoplastic materials which may be used as a secondary layer include, but are not limited to, linear low density polyethylene (LLDPE), low density polyethylene (LDPE), medium density polyethylene (MDPE), high density polyethylene (HDPE), polyester, polyolefin, and/or blends thereof.

The carpet backing is then subjected to conditions sufficient (e.g., heated) to cause the carpet backing to achieve a fluid or semi-fluid (i.e., flowable) state (Block 230). Thermoplastic materials have a wide range of melt flow rates. High melt flow rate materials typically flow easier and form air channels easier than low melt flow rate materials. Accordingly, processing temperatures are dependent on materials utilized. Reheat temperature required will be dependent upon the thermoplastic coating material and will vary accordingly. Other ways of causing the carpet backing to achieve a fluid state may include applying microwave, infrared, or other electromagnetic energy to the carpet backing.

Figure 3:
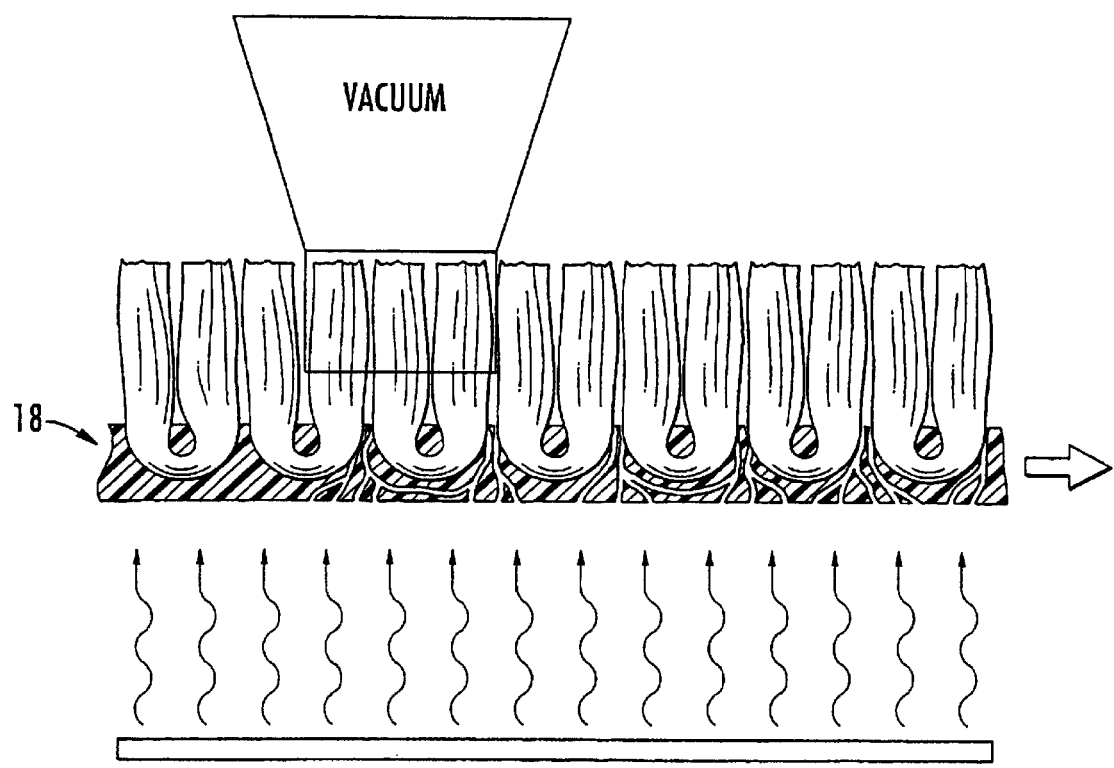
FIG. 3 is a cross-sectional view of a portion of an acoustically absorptive carpet that illustrates the carpet being passed through a vacuum system that is configured to draw air through the carpet, according to embodiments of the present invention.

Once in a fluid or semi-fluid state, air flow of sufficient flow and velocity is forced through the heated carpet backing to create porosity therein (Block 240). According to embodiments of the present invention, air flow may be provided through the heated carpet backing by subjecting the carpet backing to vacuum (FIG. 3). The vacuum causes air to be drawn through the carpet backing thereby creating porosity through the entire carpet backing. Vacuum may range from between about 0 inches of mercury to about 15 inches of mercury, depending on the particular types of material in the carpet backing and depending on the temperature of the carpet backing.

Figure 4:
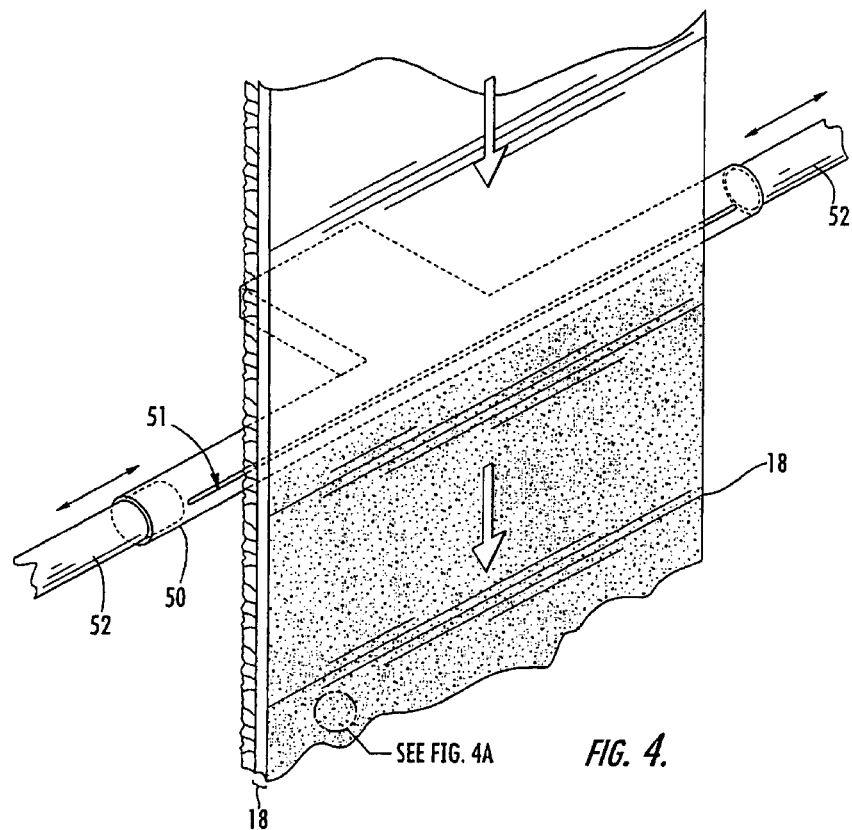
FIG. 4 is an enlarged perspective view of a vacuum rail that can be utilized in accordance with embodiments of the present invention to apply vacuum to a heated carpet backing to create porosity therein, according to embodiments of the present invention.
Figure 4A:
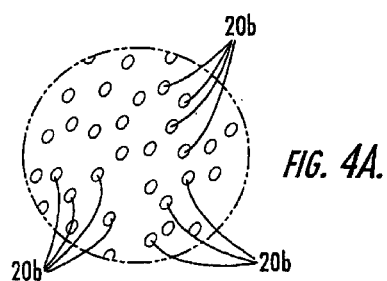
FIG. 4A is an enlarged portion of the carpet of FIG. 4 that illustrates apertures of air channels that have formed in the backing of the carpet as the carpet passes by the vacuum rail.

FIG. 4 illustrates an exemplary vacuum rail 50 that can be utilized in accordance with embodiments of the present invention to apply vacuum to a heated carpet backing to create a porous structure therein. FIG. 4A is an enlarged portion of the carpet of FIG. 4 that illustrates apertures 20b of air channels 20 that have formed in the backing 18 of a carpet 10 as the carpet 10 passes by the vacuum rail 50.

The illustrated vacuum rail 50 in FIG. 4 includes a slot 51 having a width that is variable so as to be adjustable to the width of a carpet backing. In the illustrated embodiment, slot width is controlled by deckles 52 that slide within the rail 50 to close or open the slot 51 to a desired width. According to other embodiments of the present invention, deckles 52 may be configured to slide external to the rail 50 to close or open the slot 51 to a desired width. Deckles 52 may have various shapes and configurations and may be controlled in various ways.

The vacuum rail 50 may be in communication with virtually any type of vacuum source capable of generating between about 0 and 15 inches of mercury. An exemplary vacuum source is a Vacuum Blower Package, HS Design, available from Industrial Accessories Company, Mission, Kans. Various ways of applying vacuum may be utilized. Embodiments of the present invention are not limited to the illustrated vacuum rail 50.

Other methods of providing air flow through the heated carpet backing may be utilized as well, such as forced air flow via fans, nozzles, etc. Embodiments of the present are not limited to subjecting the heated carpet backing to vacuum.

Referring back to FIG. 2, a substrate of porous material having an acoustic impedance different from that of the porous carpet is added to the porous carpet backing (Block 250). The substrate may also provide mechanical strength and/or maintain the carpeting in a formed shape. According to embodiments of the present invention, the substrate of porous material may include fibrous material selected from the group consisting of natural fibers, man-made fibers, and blends of natural fiber and man-made fibers. The carpet backing may also be formed into various configurations as required (Block 260). Exemplary forming operations include, but are not limited to, trimming the carpeting to specified dimensions, rolling the carpeting into rolls, cutting the carpeting into specified sizes and lengths, and molding/fabricating the carpeting into a three-dimensional carpeting assembly which generally corresponds to the configuration of at least a portion of a vehicle floor and/or trunk, as would be understood by those skilled in the art.

Porous, tufted carpeting according to embodiments of the present invention can enhance sound attenuation. For example, sound generated within a vehicle can be absorbed by the carpeting to provide a quieter environment within the vehicle. Carpet porosity formed in accordance with embodiments of the present invention can achieve between about 150 Rayls and about 10,000 Rayls of sound attenuation.

Figure 5A:
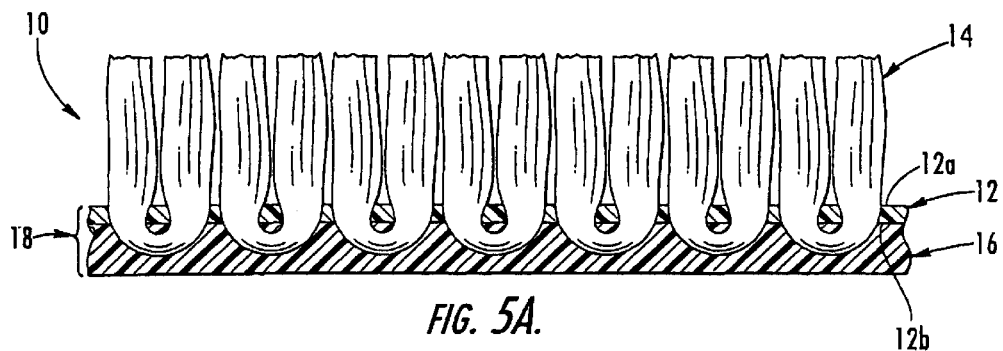
FIG. 5A is a cross-sectional view of a portion of tufted carpet, wherein a secondary layer of thermoplastic material has been added to a primary layer of thermoplastic material to form a carpet backing, according to embodiments of the present invention.
Figure 5B:
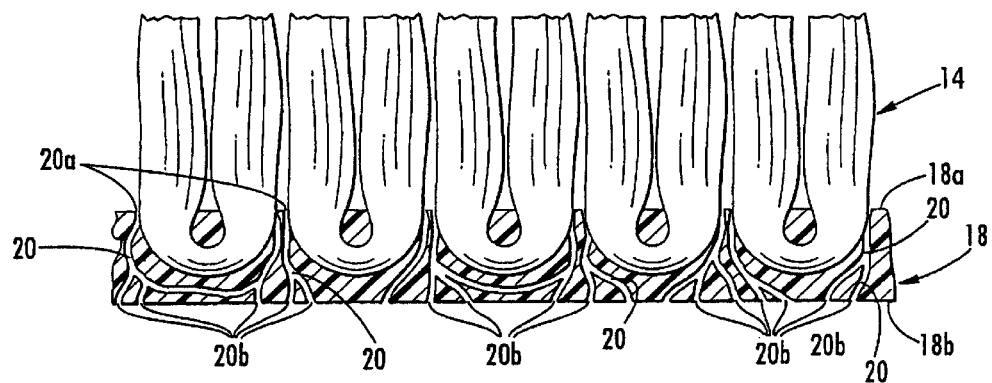
FIG. 5B is an enlarged view of a portion of the carpeting of FIG. 5A illustrating air channels formed within the carpet backing in accordance with embodiments of the present invention.
Figure 5C:
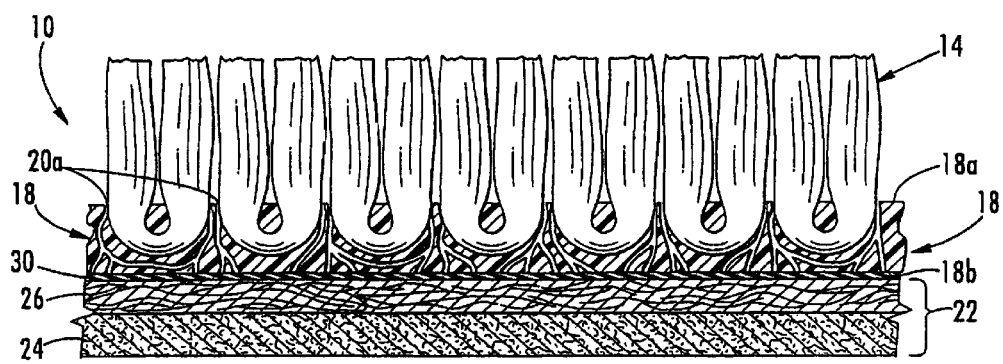
FIG. 5C illustrates the porous tufted carpet of FIG. 5B with a secondary layer attached to the carpet backing.

Referring now to FIGS. 5A-5C, section views of a portion of an acoustically absorptive tufted carpet 10, according to embodiments of the present invention, are illustrated. Referring initially to FIG. 5A, the tufted carpet 10 includes a primary layer 12 of thermoplastic fibrous material having opposite first and second sides 12a, 12b. Yarn tufts 14 extend outwardly from the primary layer first side 12a, as illustrated. The primary layer 12 may be a woven matrix of thermoplastic fibrous material or a non-woven matrix of thermoplastic fibrous material (e.g., spunbonded or spunlaced), etc. Thermoplastic fibrous materials from which the primary layer 12 may be formed include any natural or synthetic material compatible with a tufting process and that can withstand processing temperatures in excess of 200° F., and preferably in excess of 400° F. Exemplary thermoplastic fibrous materials from which the primary layer 12 may be formed include, but are not limited to, polyester, nylon, polypropylene, and/or blends thereof, and are available, for example, from Frudenburg Spunweb Colo., Durham, N.C. and Colbond Geosynthetics, Enka, N.C.

Tufted carpet utilized in accordance with embodiments of the present invention preferably has tuft densities of between about one-eighth gauge and about one-sixteenth gauge. As is known to those skilled in the art, the term "gauge" refers to the number of rows of tufts per unit of measure. For example, one-tenth gauge means that there is a row of tufts every one-tenth of an inch. However, various tuft densities may be utilized. Embodiments of the present invention are not limited to a particular tuft density or to a particular range of tuft densities. The greater the tuft density, the greater the ability to pull air through a carpet such that the material structure of the carpet can be made porous.

Typical nonwoven carpet for automotive applications range between about 4 and about 30 ounces per square yard, but are not limited to this range. Nonwoven carpet can be composed of various fiber types including, but not limited to, polyester, nylon, polypropylene, wool, cotton, and blends thereof.

A secondary layer (or precoat) 16 of thermoplastic material is attached to the primary layer second side 12b as illustrated. The secondary layer 16 is attached to the primary layer 12 in a heated condition such that the secondary layer 16 penetrates the primary layer 12 up to about 90% of a thickness of the primary layer 12 and forms a carpet backing, generally referred to as 18. FIGS. 5B-5C illustrate the carpet backing 18 as a single layer of material after the secondary layer 16 has penetrated the primary layer 12.

The secondary layer 16 may be polyethylene (e.g., linear low density polyethylene (LLDPE), low density polyethylene (LDPE), medium density polyethylene (MDPE), high density polyethylene (HDPE)), ethylene vinyl acetate (EVA), polyester, polyolefin, and blends thereof, as well as other polymers capable of meeting the process requirements for extrusion and reheat, including TPO (thermoplastic olefin), TPE (thermoplastic elastomer), and ESI (ethylene styrene interpolymer), and blends thereof. An exemplary secondary layer 16 material is a 220 melt index low density polyethylene, such as AT 192, available from AT Polymers, Brampton, Ontario—Canada. The secondary layer 16 material may have a melt index range of between about 4 and about 500 melt index. However, lower or higher melt indexes may be used if they meet process requirements. The secondary layer 16 material may be applied in an amount of between about 5 ounces per square yard and about 14 ounces per square yard.

As will be described below, the carpet backing 18 has a porous structure caused by forcing air through the carpet backing 18 when in a fluid or semi-fluid state. FIG. 5B is an enlarged view of a portion of the carpet 10 of FIG. 5A that illustrates air channels 20 that have been created through the carpet backing 18. Air channel formation originates from holes created by the tufts 14 in the primary layer 12. Thus, the greater the tuft density, the greater the number of air channels 20 that can be created and, thus, the greater the porosity of the carpet backing 18. Air channels 20 extend through the carpet backing 18 and terminate at respective apertures 20a, 20b in the respective sides 18a, 18b of the carpet backing 18.

According to embodiments of the present invention, a substrate 22 of porous material is attached to the carpet backing 18, as illustrated in FIG. 5C. The substrate 22 has a porous configuration and is configured to hold the porous carpet backing 18 open such that air can flow therethrough. The substrate 22 is configured to be attached to a vehicle panel (e.g., a floor panel) in contacting face-to-face relationship therewith.

The substrate 22 can serve the function of a binder such that the porous carpet backing can maintain a shape imposed upon it via molding and/or other forming operations. The substrate 22 may be formed from any type of material including, but not limited to foam (e.g., polyurethane foam, thermoplastic foam, etc.), massback, and other thermoformable fibrous materials including those derived from natural fibers, man-made fibers, and/or blends of natural fiber and man-made fibers. Exemplary secondary layers include Frudenberg 7220, Frudenburg Spunweb Colo., Durham, N.C. and Colbond CD50, Colbond Geosynthetics, Enka, N.C.

According to embodiments of the present invention, substrate 22 includes a layer of fine fibrous material 24 attached to a layer of coarse fibrous material 26. The layers of fine and coarse fibrous material 24, 26 each have respective different acoustic impedances. The layer of coarse fibrous material 26 has fibers in an open, loose configuration. The layer of fine fibrous material 24 includes fibers with a denier of between about 0.1 and about 50, and the layer of coarse fibrous material 26 includes fibers with a denier of between about 1 and about 100. The layers of fine and coarse fibrous material 24, 26 may be attached together in various ways including, but not limited to, needling, thermal point bonding and/or via adhesives. Needling, thermal point bonding and adhesive bonding are well understood by those skilled in the art and need not be described further herein.

According to embodiments of the present invention, the layer of coarse fibrous material 26 has a thickness of between about 0.5 mm and about 100 mm, and the layer of fine fibrous material 24 has a thickness of between about 0.5 mm and about 100 mm. The layers of fine and coarse fibrous material 24, 26 may each include natural fibers, man-made fibers, and blends of natural fiber and man-made fibers.

Figure 6:
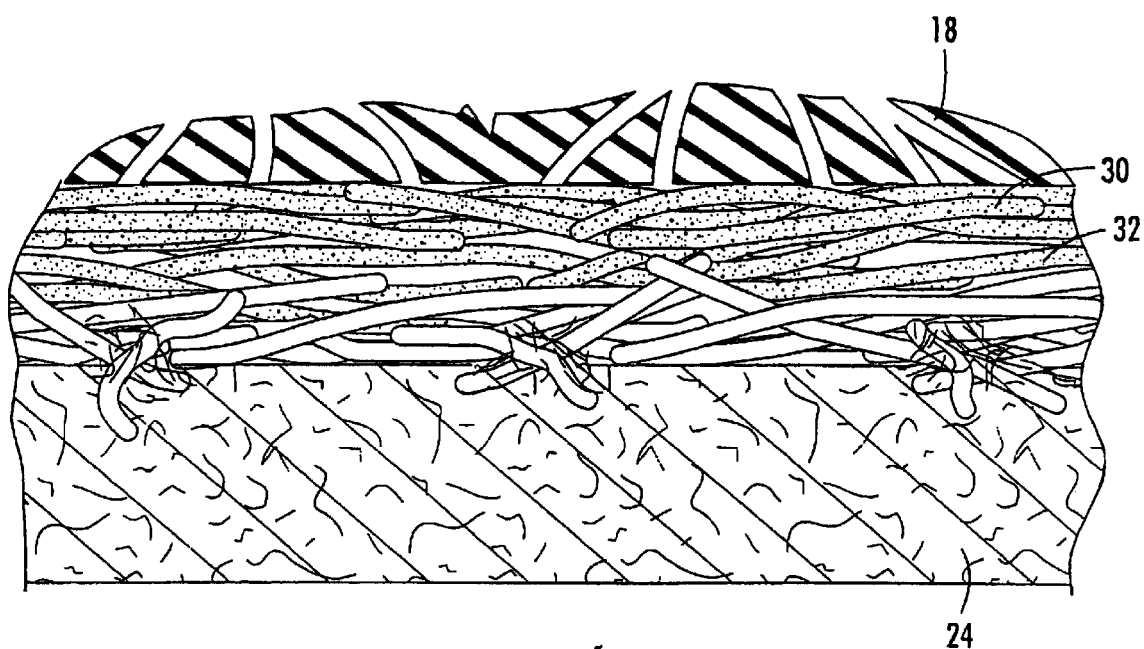
FIG. 6 is an enlarged view of a portion of the carpet of FIG. 5C illustrating the encapsulation of fibers in the coarse layer with thermoplastic adhesive such that porosity is not hindered.

The carpet backing 18 is bonded to the layer of coarse fibrous material 26 with a thermoplastic material 30 such that the thermoplastic material 30 encapsulates individual fibers 32 of the layer of coarse fibrous material 26 without extending therebetween, and such that the layer of fine fibrous material 24 remains porous. FIG. 6 is an enlarged view of the adhesive encapsulation of fibers 32 in the layer of coarse fibrous material 26 that does not hinder porosity. In other words, the thermoplastic adhesive 30 does not extend between fibers 32.

According to other embodiments of the present invention, the layer of coarse fibrous material 26 may be bonded directly to the carpet backing 18 via a porous adhesive (or via other known methods). The layer of fine fibrous material 24 may then be bonded directly to the coarse fibrous material via a porous adhesive.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An acoustically absorptive multilayer article, comprising:
    a backing layer of thermoplastic material having opposite first and second sides and a plurality of fiber tufts that extend outwardly from the first side;
    a plurality of air channels formed in the backing layer that extend between the first and second sides of the backing layer and that terminate at respective apertures in the backing layer first and second sides; and
    a multilayer substrate of porous material comprising a distinct layer of fine fibrous material attached to a distinct layer of coarse fibrous material, wherein the layer of coarse fibrous material comprises fibers in an open, loose configuration;

wherein the backing layer is bonded to the layer of coarse fibrous material with a thermoplastic material that encapsulates individual fibers of the layer of coarse fibrous material without extending between the individual fibers, and such that the layer of fine fibrous material is porous.

2. The article of claim 1, wherein the backing layer has a first acoustic impedance, and wherein the multilayer substrate has a second acoustic impedance that is different from the first acoustic impedance.

3. The article of claim 1, wherein the layer of fine fibrous material comprises fibers with a denier of between about 0.1 and about 50, and wherein the layer of coarse fibrous material comprises fibers with a denier of between about 1 and about 100.

4. The article of claim 1, wherein the layers of fine and coarse fibrous material are attached together via needling.

5. The article of claim 1, wherein the layers of fine and coarse fibrous material are attached together via thermal point bonding.

6. The article of claim 1, wherein the layers of fine and coarse fibrous material are attached together via adhesive.

7. The article of claim 1, wherein the layer of coarse fibrous material has a thickness of between about 0.5 mm and about 100 mm.

8. The article of claim 1, wherein the layers of fine and coarse fibrous material each comprise material selected from the group consisting of natural fibers, man-made fibers, and blends of natural fiber and man-made fibers.

* * * * *

UNITED STATES PATENT AND TRADEMARK OFFICE
CERTIFICATE OF CORRECTION

| | | |
|---|---|---|
| PATENT NO. | : 7,537,818 B2 | Page 1 of 1 |
| APPLICATION NO. | : 10/508101 | |
| DATED | : May 26, 2009 | |
| INVENTOR(S) | : Allison et al. | |

It is certified that error appears in the above-identified patent and that said Letters Patent is hereby corrected as shown below:

In the Claims:

Column 8, Claim 1, Line 57: According to Supplemental Examiner's Amendment,
Please correct "of fiber tufts" to read -- of yarn tufts --

Column 9, Claim 1, Line 5:
Please correct "fibers, and such" to read -- fibers, such --

Signed and Sealed this
Thirtieth Day of October, 2012

David J. Kappos
*Director of the United States Patent and Trademark Office*